United States Patent

[11] 3,612,794

[72] Inventor Harry Winter
Granville, Ohio

[21] Appl. No. 887,106
[22] Filed Dec. 22, 1969
[45] Patented Oct. 12, 1971
[73] Assignee Bell Telephone Laboratories Incorporated
Murray Hill, Berkeley Heights, N.J.

[54] FLUID CONTROLLED SWITCHING NETWORK
8 Claims, 3 Drawing Figs.

[52] U.S. Cl. .......... 200/81.6, 137/81.5, 235/200 R
[51] Int. Cl. .......... H01h 29/28
[50] Field of Search .......... 200/81.6, 81.5, 81.4; 235/200 R; 137/81.5

[56] References Cited

UNITED STATES PATENTS

| | | | |
|---|---|---|---|
| 3,526,723 | 9/1970 | Thomson .......... | 137/81.5 X |
| 3,539,743 | 11/1970 | Winter .......... | 137/81.5 X |
| 3,548,857 | 12/1970 | Anderson .......... | 137/81.5 X |
| 3,151,623 | 10/1964 | Riordan .......... | 137/112 |
| 3,328,543 | 6/1967 | Johnston et al. .......... | 200/81.6 |
| 3,461,435 | 8/1969 | Hoffman .......... | 340/173 |
| 3,492,612 | 1/1970 | Ayres et al. .......... | 200/81.6 X |

*Primary Examiner*—David Smith, Jr.
*Assistant Examiner*—William J. Smith
*Attorneys*—R. J. Guenther and Kenneth B. Hamlin

ABSTRACT: A coordinate array of fluid-pressure-operated, metallic-contact switching devices are interconnected to provide destructive mark switching operation. Each crosspoint of the array includes two such switching devices with the contacts thereof electrically connected in series. Two sets of row and column fluid channels are arranged such that a fluid pulse on a row or column channel of one set releases at least one switching device at each crosspoint connected to the row or column. Coincident fluid pulses on a row channel and a column column channel of the other set operates both switching devices at a selected crosspoint Destructive mark operation is achieved by timing or pressure differential between the fluid pulses on the two sets of row and column channels.

INVENTOR
H. WINTER
BY D. E. Snedeker
ATTORNEY

FLUID CONTROLLED SWITCHING NETWORK

BACKGROUND OF THE INVENTION

This invention relates to switching circuits and, more particularly, to switching circuits which selectively effect an electrical metallic-contact connection between one or more of a plurality of input conductors and one or more of a plurality of output conductors.

The trend in the design of present day electronic circuits such as for telephone systems, computer systems, information handling systems and the like, is toward ever increasing application of integrated circuit technology permitting the employment of batch fabrication techniques in manufacture. Significant improvements have been achieved in size and cost of the logic control and processing circuitry for these systems. However, only limited success has been attained in extending these techniques to the peripheral units, such as the switching circuits. Thus, present telephone systems, even electronic telephone systems, still employ electromechanical switching circuits in the form, for example, of the familiar crossbar switch and reed switch networks.

Various arrangements have been proposed employing electronic switching devices in switching circuits. Although satisfactory in certain applications, the use of electronic switching devices has been found generally unsuitable for telephone switching networks in that they fail to meet the overall performance of metallic contacts, as provided by the present electromechanical switching circuits. In particular, metallic contacts provide two stable states, one a very high open contact impedance, and the other a very low closed contact impedance, characteristics which are considered essential for a speech path switching device. However, known metallic contact switching circuits generally suffer from various disadvantages related to cost, size, weight, power consumption and mechanical contact phenomena.

Furthermore, it is often desirable in coordinate switching arrays, particularly in modern telephone switching networks, to provide positive control of unselected switching elements, rather than rely upon their lack of response to other than coincident signals. In addition, it is desirable in telephone switching networks for the selection of a coordinate switching element to effect the release of other switching elements connected to the selected control paths. This type of switching operation is sometimes referred to as "destructive mark" operation and eliminates the need for separate control steps for operate and for release of the switching elements.

SUMMARY OF THE INVENTION

A principal object of this invention, therefore, is to provide a switching circuit having the desirable characteristics of known metallic contact switching circuits but which is more economical, compact and rugged and which is substantially free from the disadvantages of mechanical contact phenomena.

A further object of this invention is to provide a simple, economical and reliable metallic contact switching circuit which can be batch-fabricated, utilizing integrated circuit technology.

Another object of this invention is to provide a compact and inexpensive coincident-signal controlled switching network in which the selection of a particular switching element automatically releases other switching elements connected to the same control paths as the selected switching element.

In an illustrative embodiment of the present invention, the above and other objects are attained through the use in a coordinate switching array of fluid-pressure-operated bistable switching devices, each comprising two compartments or chambers interconnected with one another through a restricted passage in the manner, for example, of an hourglass-shaped structure. One of the compartments contains conductive material, such as a globule of mercury, free movement of which between the two compartments is prevented by the restricted passage. Electrically conductive contacts are disposed in one of the two compartments so as to be bridged by the conductive material when the material is in the one compartment, thereby providing an electrical connection between the bridged contacts.

Individual input fluid pressure paths associated with each of the compartments are connected over row and column fluid control paths to access circuitry. Increasing the fluid pressure in one of the input fluid pressure paths effects transfer of the conductive material from the compartment associated with the one input path through the restricted passage to the other compartment. A suitable switching device of this type is described in detail, for example, in my copending application, Ser. No. 659,686, filed Aug. 10, 1967, now U.S. Pat. No. 3,539,743, issued Nov. 10, 1970.

In accordance with one aspect of the present invention, a pair of these switching devices, with their contacts electrically connected in series, are included at each cross-point of the array. Switching control signals are applied over row and column fluid pressure paths comprising two coordinate sets of fluid channels connected respectively to corresponding compartments of the pair of switching devices. The two sets of fluid channels are arranged such that a control signal on a row and column channel of one set releases at least one switching device at each cross-point connected to the row or column, while coincident control signals on a row channel and a column channel of the other set operates both switching devices at a selected cross-point to complete an electrical path through the serially connected contacts thereof. Destructive mark operation is thus achieved advantageously in accordance with the present invention by timing or pressure differential between the control signals on the two sets of row and column fluid channels.

A fluid controlled switching circuit in accordance with my invention, besides attaining the objects set forth above, provides a further important advantage over electromechanical switching circuits in that there is no interaction between the controlling and controlled circuits. This may be readily appreciated from the fact that the controlling fluid does not conduct current, nor does it radiate electromagnetic energy.

Moreover, in accordance with another advantage of the present invention, no fluid logic or gating circuitry is required at the individual cross-points, thereby providing a metallic-contact switching network which is inexpensive and which is substantially more compact, on the order of a magnitude more compact, than heretofore known. Switching networks having, for example, 1000 cross-point switching elements, constructed according to my invention using known integrated circuit techniques, would require only on the order of 1 cubic inch of packaging space.

BRIEF DESCRIPTION OF THE DRAWING

The above and other objects and features of the invention may be fully apprehended from the following detailed description and the accompanying drawing in which.

DETAILED DESCRIPTION OF THE INVENTION

Figure 1:
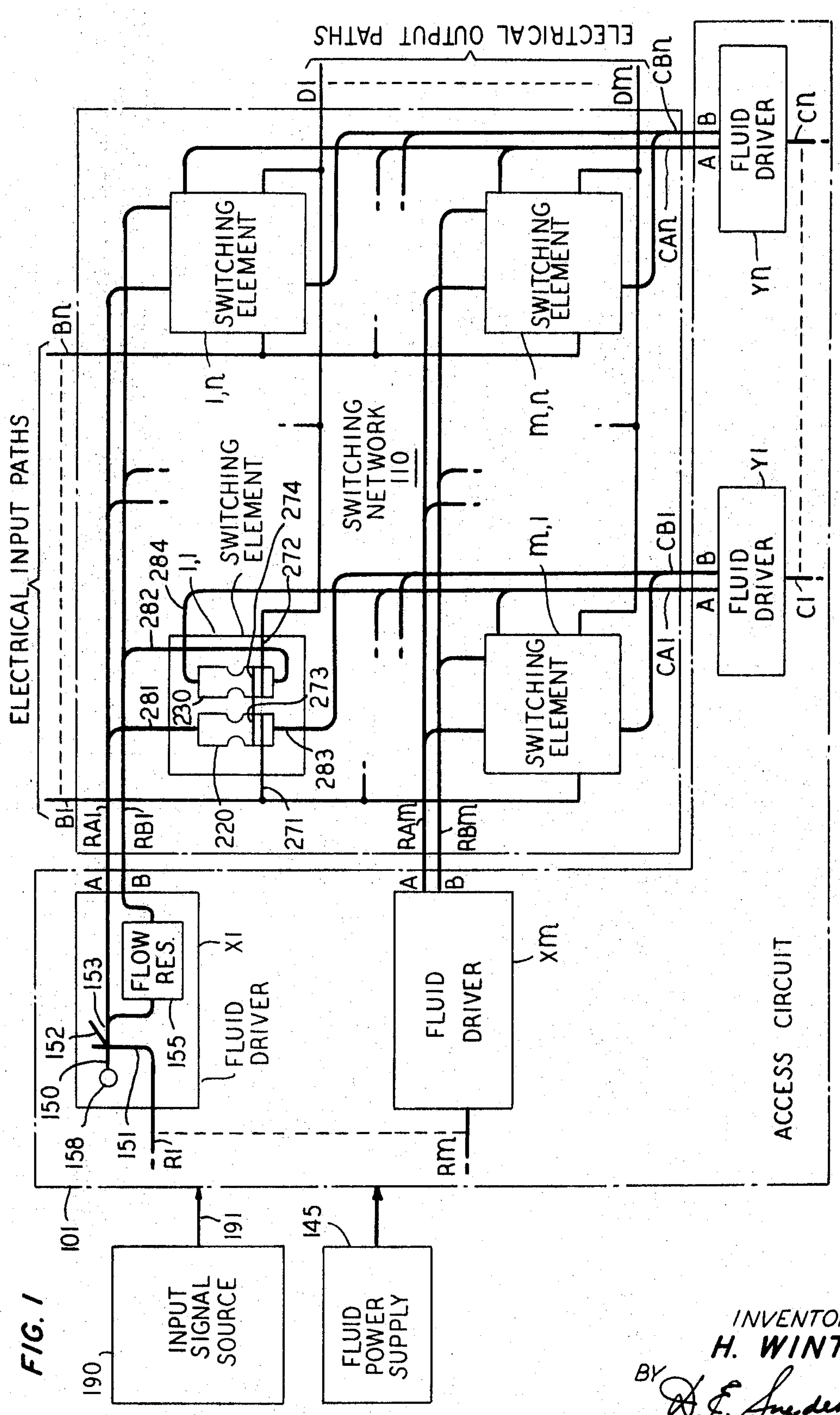
FIG. 1 is a block diagram of an illustrative fluid controlled switching network in accordance with the principles of my invention.

In the illustrative switching network embodiment of FIG. 1, a plurality of switching elements are arranged in an *m* by *n* coordinate array B*1*–connecting one of a plurality of electrical input paths B*l*–B*n* to one of a plurality of electrical output paths D*1*–D*m*. The cross-point electrical connections between the individual input and output paths of switching network 110 are effected selectively in accordance with electrical addressing signals over path 191 from input signal source 190. In a telephone switching system, for example, addressing signals may be provided over path 191 by the marker or common control circuitry, such as in response to the dialing or keying of a telephone number.

Access circuit 101, in turn, translates the electrical addressing signals on path 191 into corresponding fluid pressure control signals on row control channels RA*l* and RB*l* through RA*m* and RB*m* and on column control channels CA*l* and CB*l* through CA*n* and CB*n* to switching network 110. For this purpose access circuit 101 may comprise any known electric-to-fluidic converter, such as a simple solenoid arrangement, for translation of the electrical addressing signals on path 191 into appropriate fluid addressing signals on row and column address channels R*l*–R*m* and C*l*–C*n*. Advantageously, however, access circuit 101 may comprise a converter particularly suited to batch-fabrication techniques, such as the type disclosed, for example, in U.S. Pat. No. 3,526,723 issued to D. J. Thomson Sept. 1, 1970 or in U.S. Pat. No. 3,548,857 issued to L. G. Anderson-D. J. Thomson Dec. 22, 1970.

The fluid pressure flow for developing the fluid addressing signals on row and column address channels R*l*–R*m* and C*l*–C*n* and for operating the switching elements in network 110 is provided by fluid power supply 145. The working fluid, as is known in the art, may be gaseous or liquid, though an inert gas such as nitrogen is usually preferred. Numerous arrangements are known in the art, such as diaphragm compressors, which may be included in fluid power supply 145 for providing the appropriate working fluid pressure. Moreover, the fluid pressure need not be provided continuously for applications such as in telephone switching systems, but rather may be provided intermittently during the times required for actual switching operation.

As mentioned above, the fluid pressure control signals for operating selected cross-point switching elements of network 110 are provided on two sets of row and column control channels, an operate set and a release set, designated A and B, respectively, in FIG. 1. The control signals are provided by row fluid drivers X*l*–X*m* and column fluid drivers Y*l*–Y*n* according to the fluid addressing signals on respective row and column address channels R*l*–R*m* and C*l*–C*n*. Fluid driver X*l*, and each of the other fluid drivers in access circuit 101, comprises a fluid gate element 150, shown illustratively in FIG. 1 as a conventional monostable OR/NOR gate, having an output thereof connected directly to a corresponding row control channel of operate set A, such as channel RA*l*. The output of gate element 150 is also connected through a pressure dropping arrangement, depicted as flow resistor 155, to a corresponding row control channel of release set B, such as channel RB*l*.

The operation of such fluid gates is well known in the art and will be considered only briefly here as may be necessary to an understanding of the present invention. Fluid pressure flow from power supply 145 enters the gate at aperture 158. In the absence of a fluid addressing signal extended to control input arm 151, such as over addressing channel R*l*, the fluid flow through aperture 158 tends to be directed through NOR output leg 153, and thus to row control channels RA*l* and RB*l*. This may be referred to as the monostable state of gate 150. The pressure flow directed to release channel RB*l* is, of course, lower than that directed to operate channel RA*l*, the pressure differential being determined by flow resistor 155.

On the other hand, in the presence of a fluid addressing signal extended to control input arm 151, the fluid flow through aperture 158 is deflected to OR output leg 152. This may be referred to as the switched state of gate 150 with substantially no fluid flow entering NOR output leg 153. The fluid flow in output leg 152 is vented to the atmosphere or returned to power supply 145, depending upon the particular system. Upon termination of control input fluid flow through control arm 151, gate 150 returns to its monostable state, the power fluid flow from aperture 158 reattaching to NOR output leg 153 and substantially no fluid flow remaining in leg 152. Thus, in the present illustrative embodiment, each gate 150 may be considered as an inverter or negative OR gate, a fluid output appearing in NOR output let 153 only during the absence of a control input at arm 151.

Figure 2:
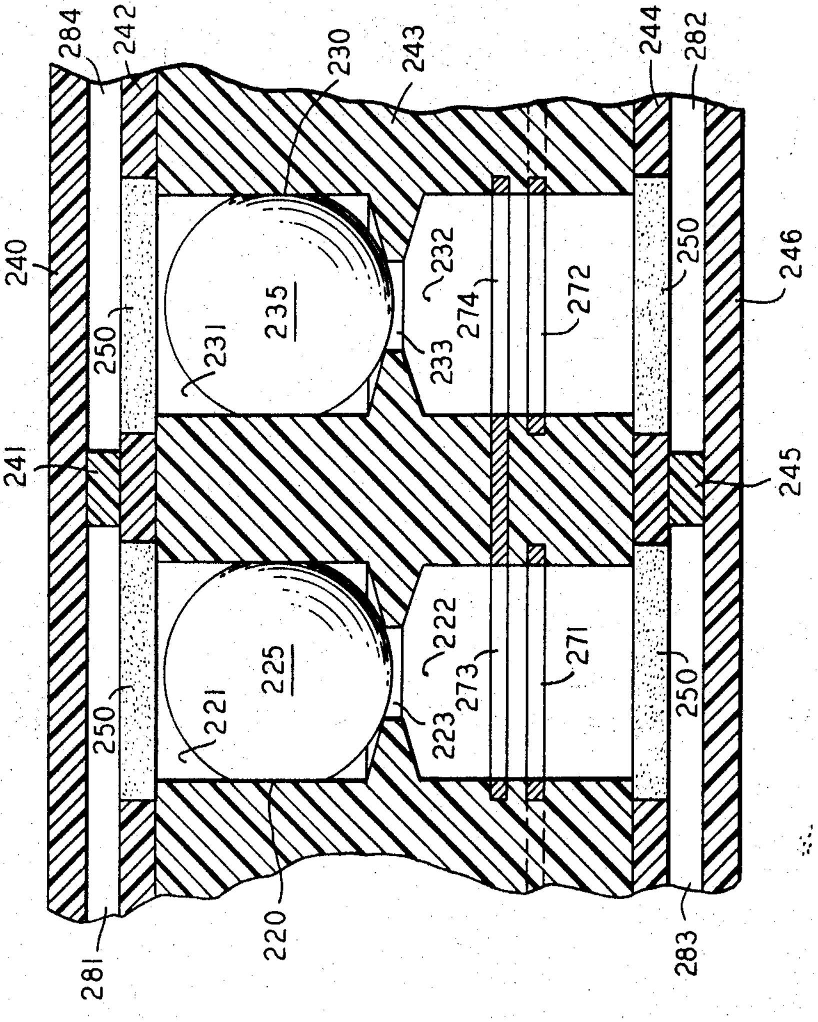
FIG. 2 is a sectional view of a fluid controlled switching element employed in the illustrative arrangement of FIG. 1.

The cross-point switching elements in network 110, as mentioned, each comprise a pair of bistable, fluid-controlled switching devices which may be shaped generally in the manner of an hourglass structure, as shown schematically in FIG. 1 and in greater detail in FIG. 2. As depicted illustratively in FIG. 2, switching network 110 may be advantageously of laminated construction comprising, for example, a plurality of laminations 240 through 246. Laminated construction of the switching network permits batch-fabrication thereof using known integrated circuit manufacturing techniques to provide a simple, compact and inexpensive switching network. Laminations 240 and 246 are cover plates to seal the the network and may be provided with fluid apertures or ports for extending fluid pressure signals therethrough from access circuit 101 or to other switching networks. Fluid pressure control signals are transmitted through the switching network via vertical fluid channels or paths formed by aligned apertures in the laminations which, in combination with horizontal fluid channels disposed in the respective laminations, operatively interconnect the various switching elements of the network.

Each switching device comprises two compartments or chambers interconnected with one another through a restricted passage. Thus, referring to FIG. 2, switching device 220 comprises compartments 221 and 222 interconnected through restricted passage 223; and similarly, switching device 230 comprises compartments 231 and 232 interconnected through restricted passage 233. One compartment of each device contains electrically conductive material, such as material 225 and 235, the free movement of which between the two compartments is prevented by the restricted passage. For example, as shown illustratively in FIG. 2, conductive material 225 and 235 may comprise globules of conductive liquid, such as mercury, which are nonwetting and which are of sufficiently high surface tension to prevent free movement of the globules through restricted passages 223 and 233, respectively.

Electrically conductive contacts are disposed in one compartment of each switching device so as to be electrically bridged by the conductive material when the material is in the one compartment. Thus, electrical contacts 271 and 273 are disposed in lower compartment 222 of device 220, and contacts 272 and 274 are disposed in lower compartment 232 of device 230. The electrical contacts of each pair of switching devices are serially interconnected, in accordance with one aspect of the invention, such that when the contacts of both switching devices at a cross-point are bridged by conductive material, an electrical connection is established through the two devices between one of input paths B*l*–B*n* (connected to contact 271, for example) and one of output paths D*l*–D*m* (connected to contact 272, for example).

Individual input fluid pressure paths 281 and 283 are associated with switching device compartments 221 and 222, respectively, of device 220; and individual input fluid pressure paths 284 and 282 are associated with compartments 231 and 232, respectively, of device 230. Increasing the fluid pressure in one of the input paths associated with a switching device effects transfer of the conductive material in the device from the compartment associated with the one input path through the restricted passage into the other compartment. For example, if the fluid pressure in path 281 is increased sufficiently, relative to the fluid pressure in path 283, conductive material 225 will be urged through reconstructed passage 223 into compartment 222, bridging contacts 271 and 273 to provide an electrical connection therebetween.

The input fluid pressure paths are illustratively connected to the associated switching device compartments in FIG. 2 through foraminous interface material 250, which may be a porous ceramic or plastic material, for example. Foraminous interface material 250 prevents the conductive material in the switching devices from entering the fluid pressure paths, but is porous to fluid pressure flow therethrough.

With the above description in mind, the operation of the illustrative switching network embodiment of FIG. 1 will now be described. The fluid channels or paths, such as fluid channels RA*l* and RB*l* are shown in heavy lines in FIG. 1 to distinguish them from the electrical paths shown in lighter lines, such as paths B*l* and D*l*. It will be recalled that responsive to electrical addressing signals on path 191, any one of electrical input paths B*l*–B*n* can be connected selectively to any one of electrical output paths D*l*–D*m*. The selective electrical interconnections between the input and output paths are effected via fluid controlled switching elements *l,l* through *m,n*. Each of the switching elements is substantially identical to the switching element shown in FIG. 2 and described above.

The input and output electrical paths associated with each cross-point switching element are respectively connected to electrical contacts 271 and 272 disposed in the lower compartments of switching devices 220 and 230 at the cross-point. It is assumed initially that the conductive material of each switching device is located in the upper compartment thereof in FIG. 1 and thus that all cross-point electrical connections between the input and output paths are broken. Assume further that power fluid flow is extended by power supply 145 to fluid drivers X*l*–X*m* and Y*l*–Y*n* and that fluid flow is provided to each of row and column address channels R*l*–R*m* and C*l*–C*n*. In the initial deenergized switching network state, therefore, fluid pressure flow is directed through output leg 152 of gate 150 in each fluid driver and is returned to power supply 145 or vented to the atmosphere. With all of gates 150 in their switched states no fluid pressure flow appears in the operate row and column control channels RA*l* and CA*l* through RA*m* and CA*n* or in the release row and column control channels RB*l* and CB*l* through RB*m* and CB*n*.

Assume now, by way of example, that it is desired to establish an electrical connection between input path B*l* and output path D*l*, as indicated by suitable addressing signals from source 190 over path 191. The electrical addressing signals on path 191 are translated by access circuit 101 into corresponding fluid addressing signals for selecting the row and column fluid control channels associated with switching element *l,l*. Specifically, access circuit 101, responsive to the addressing signals on path 191, removes the fluid flow from address channels R*l* and C*l*, Ωand thus from the control input arms 151 of gates 150 in fluid drivers X*l* and Y*l*. The consequent return of gates 150 in drivers X*l* and Y*l* to a monostable state, in the manner described above, directs control signals in the form of fluid pressure flow therethrough to row control channels RA*l* and RB*l* and to column control channels CA*l* and CB*l*, respectively. Flow resistor 155 in drivers X*l* and Y*l* reduces the pressure of the fluid flow in release control channels RB*l* and CB*l* to approximately one-half the pressure of the fluid flow in operate control channels RA*l* and CA*l*.

Consequently, at the selected cross-point the higher pressure in the operate row and column control channels RA*l* and CA*l* overrides the lower pressure in release control channels RB*l* and CB*l*. Responsive thereto, the conductive material in switching devices 220 and 230 is transferred from the upper compartments thereof to the lower compartments, bridging the contacts therein to establish an electrical connection between input path B*l* and output path D*l*. Upon subsequent cessation of the control signals on channels RA*l*, RB*l*, CA*l* and CB*l*, the conductive material remains in the lower compartments of devices 220 and 230 to maintain the electrical connection between paths B*l* and D*l*. This may be referred to as the operated state of the switching element.

In accordance with an important aspect of the switching network of the present invention, the selection and operation of a particular cross-point switching element automatically releases other switching elements connected to the same control paths as the selected switching element. Thus, for example, the selection and operation of devices 220 and 230 in switching element *l,l* in the manner described above automatically effects the release of any previously operated ones of the switching elements connected to row control channels RA*l* and RB*l* (such as element *l,n*) and also of the elements connected to column control channels CA*l* and CB*l* (such as element *m,l*).

For the purposes of describing such destructive mark operation of network 110, assume that switching element *l,l* is in an operated state and that it is desired to operate switching element *m,l* to establish an electrical connection between input path B*l* and output path D*m*. Access circuit 101, responsive to addressing signals on path 191, removes the fluid flow from address channels R*m* and C*l*, returning gates 150 in fluid drivers X*m* and Y*l* to monostable states. Power fluid flow is thus directed as a control signal through driver X*m* to row control channels RA*m* and RB*m* and, at the same time, through driver Y*l* to column control channels CA*l* and CB*l*, thereby operating the two switching devices at element *m,l* in the manner described above. An electrical connection is thus completed therethrough between paths B*l* and D*m*.

Concurrently, the presence of fluid pressure flow on column release channel CB*l* is extended over path 283 to the lower compartment of device 220 in switching element *l,l*. Inasmuch as no fluid pressure flow appears at this time on row operate channel RA*l*, the conductive material in device 220 is transferred from the lower compartment thereof to the upper compartment, breaking the previously established electrical contact connection between paths B*l* and D*l*. It will be noted that the conductive material in device 230 of switching element *l,l* remains in the lower compartment bridging contacts 272 and 274. In fact, were the conductive material not assumed to be already disposed in the lower compartment of device 230, it would be transferred there by the control signal on operate column channel CA*l*. However, so long as at least one of the switching devices at a cross-point has the conductive material therein disposed in the upper compartment of the device, the electrical contact connection through the cross-point switching element is broken, which may be referred to as the released state of the switching element.

It will be apparent, of course, that the fluid control signals are applied over the row and column control paths to switching element *m,l* at substantially the same time as they are applied to switching element *l,l*. However, it is assumed that the contact break or release at element *l,l* occurs prior to the contact make operation at element *m,l* to prevent momentary unwanted electrical interconnections between the input and output paths. Break-before-make operation is provided in the embodiment of FIG. 1 principally by the symmetrical nature of the illustrative switching device structure employed and by the differential fluid pressure flow in the two sets of row and column control channels. Other switching device configurations will be obvious to those skilled in the art for achieving or enhancing the break-before-make operation thereof.

Figure 3:
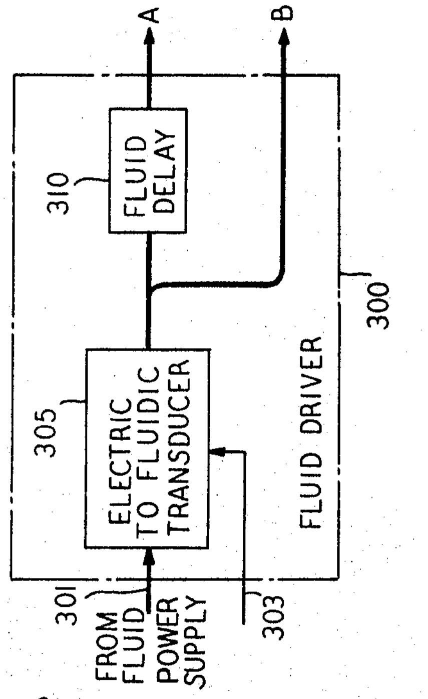
FIG. 3 shows an alternative embodiment of a fluid driver for use in the arrangement of FIG. 1.

Alternatively, break-before-make operation of the cross-point element switching devices can be attained by providing timing differential between the control signals on the operate row and column control channels and the corresponding control signals on the release row and column control channels. Thus, in the illustrative example just described, the control signals may be provided first on release channels RB*m* and CB*l* and, on termination thereof, then be provided on operate channels RA*m* and CA*l*. Timing differential for the control signals may be provided quite simply, for example, by inserting a suitable fluid delay element in operate output channel A of each fluid driver and removing flow resistor 155 from release output channel B, as shown in FIG. 3. Other arrangements for providing control signal timing differential will be obvious to those skilled in the art.

The fluid driver embodiment in FIG. 3 also illustratively comprises an electric-to-fluid transducer 305 in place of fluid gate 150, transducer 305 including any of the known arrangements for converting electrical signals into corresponding fluidic signals, such as the converters mentioned above. Fluid pressure flow is extended to transducer 305 from the fluid power supply over input channel 301 and, in the presence of an electrical addressing signal on control input lead 303, is directed through transducer 305 to operate output channel A and to release output channel B. In the absence of an electrical addressing signal on control input lead 303, no fluid flow is extended through transducer 305. The fluid driver embodiment of FIG. 3 may be employed advantageously in those switching applications wherein it is desired to eliminate the need for translation of the electrical addressing signals into corresponding fluid addressing signals in the manner of the embodiment of FIG. 1.

Although the switching device embodiment herein has been depicted illustratively as a generally hourglass-shaped structure, it will be apparent that other configurations may be employed with equal facility, as well as various types of conductive material therein. For example, the restriction to passage of the conductive material between the upper and lower compartments need not be by virtue of size or shape in the interconnection between the two compartments but may be by virtue of a suitable foraminous material interposed between the two compartments. Moreover, various alternatives exist for the conductive material in the switching devices and, in fact, inasmuch as fluid devices are operable at elevated or reduced temperatures without impairment, the conductive material need not be fluid at ambient temperatures. It is to be understood, therefore, that the above-described arrangements are but illustrative of the application of the principles of applicant's invention. Numerous other arrangements may be devised by those skilled in the art without departing from the spirit and scope of the invention.

What is claimed is:

1. A cross-point switching arrangement comprising a pair of bistable fluid-controlled switches, each of said switches including a housing having two compartments separated by a restricted passage, electrically conductive material disposed in one of said compartments, said restricted passage preventing free movement of said material between said two compartments, and electrically conductive contacts disposed in one of said compartments so as to be bridged by said conductive material when said material is in said one compartment;

means connecting said contacts of said pair of switches in series;

first and second sets of row and column fluid channels;

means coupling a row channel of said first set and a column channel of said second set to respective compartments of one of said switches;

and means coupling a column channel of said first set and row channel of said second set to respective compartments of the other of said switches such that said row and column channel of each set are respectively coupled to corresponding compartments of said pair of switches.

2. A cross-point switching arrangement according to claim 1 further comprising means for providing different pressure fluid signals to said first and second sets of fluid channels, respectively.

3. A cross-point switching arrangement according to claim 1 further comprising means for providing fluid signals to said first and second sets of fluid channels at different times.

4. A switching arrangement comprising a pair of fluid controlled switches, each of said switches including first and second compartments separated by a restricted passage, a movable electrically conductive element disposed in one of said compartments, said restricted passage preventing free movement of said movable element between said two compartments, and electrically conductive contacts disposed in said second compartment so as to be bridged by said movable element when said element is in said second compartment, said pair of switches comprising a cross-point switching element in a switching network;

means serially interconnecting said contacts disposed in said pair of switches;

a first pair of fluid pressure paths individually coupled to said first compartments, respectively, of said pair of switches;

a second pair of fluid pressure paths individually coupled to said second compartments, respectively, of said pair of switches;

a first set of row and column fluid control channels individually coupled to respective ones of said first pair of fluid pressure paths, and a second set of row and column fluid control channels individually coupled to respective ones of said second pair of fluid pressure paths, such that each of said switches is coupled to a respective row channel of one of said first and second sets and to a respective column channel of the other of said sets;

whereby a fluid pressure signal in one of said paths coupled to a switch effects movement of said movable element from the compartment coupled to said one path through said restricted passage into the other compartment of said switch.

5. A switching arrangement according to claim 4 further comprising means for selectively providing fluid signals to said first and second sets of row and column control channels responsive to the receipt of electrical input signals, said last-mentioned means comprising first fluid driver means coupled to said row channels of said first and second sets and second fluid driver means coupled to said column channels of said first and second sets.

6. A switching arrangement according to claim 4 further comprising means for providing fluid signals differentially to said first and second sets of control channels, such that the provision of fluid signals on both said row channel and said column channel coupled to one of said switches effects movement of said movable element in said one switch to said second compartment thereof, thereby bridging said electrical contacts disposed in said second compartment.

7. A switching arrangement according to claim 6 wherein said differential fluid signal providing means comprises means for providing signals of greater fluid pressure to said first set of control channels than to said second set of control channels.

8. A switching arrangement according to claim 6 wherein said differential fluid signal providing means comprises means for providing fluid signals to said second set of control channels prior to providing fluid signals to said first set of control channels.